US010196167B2

(12) United States Patent
Marin

(10) Patent No.: US 10,196,167 B2
(45) Date of Patent: Feb. 5, 2019

(54) PREFORM AND CONTAINER

(71) Applicant: Alpla Werke Alwin Lehner GmbH & Co. KG, Hard (AT)

(72) Inventor: Dietmar Marin, Bildstein (AT)

(73) Assignee: ALPLA WERKE ALWIN LEHNER GMBH & CO. KG, Hard (AT)

( * ) Notice: Subject to any disclaimer, the term of this patent is extended or adjusted under 35 U.S.C. 154(b) by 662 days.

(21) Appl. No.: 14/676,482

(22) Filed: Apr. 1, 2015

(65) Prior Publication Data
US 2015/0202818 A1    Jul. 23, 2015

Related U.S. Application Data

(63) Continuation of application No. PCT/EP2013/003002, filed on Oct. 5, 2013.

(30) Foreign Application Priority Data

Nov. 7, 2012  (CH) ...................... 2287/12

(51) Int. Cl.
*B65D 1/02* (2006.01)
*B65D 35/08* (2006.01)
(Continued)

(52) U.S. Cl.
CPC ............ *B65D 1/0207* (2013.01); *B29B 11/14* (2013.01); *B29B 11/16* (2013.01);
(Continued)

(58) Field of Classification Search
CPC ...... B65D 1/02; B65D 1/0207; B65D 1/0223; B65D 1/0261; B65D 35/08; B29B 11/16;
(Continued)

(56) References Cited

U.S. PATENT DOCUMENTS 4,928,835 A    5/1990 Collette et al.
6,063,325 A *  5/2000 Nahill ................ B29C 45/1643
                                      264/328.12
(Continued)

FOREIGN PATENT DOCUMENTS

EP    2 100 707 A1    9/2009
JP    2000-043128 A   2/2000
(Continued)

OTHER PUBLICATIONS

International Search Report (PCT/ISA/210) dated Nov. 15, 2013, by the Swiss Patent Office as the International Searching Authority for International Application No. PCT/EP2013/003002.
(Continued)

*Primary Examiner* — Walter Aughenbaugh
(74) *Attorney, Agent, or Firm* — Buchanan Ingersoll & Rooney PC

(57) ABSTRACT

An injection-molded preform for manufacturing plastic containers, for example plastic bottles, in a stretch blow molding process is disclosed. The preform can have an essentially elongated preform body, whose one longitudinal end is formed closed. On an opposite longitudinal end, the preform body is connected to a neck section that is provided with a pour opening and whose outer wall has a connector to make an interlocking connection with a closure that is equipped with corresponding engagement. The neck section has at least one constriction that extends all the way around and has a wall thickness of between 0.4 mm and 0.8 mm. The injection-molded plastic material exists at least on the at least one constriction in a state that is highly oriented and at least partially crystalline, due to an injection-molding process.

14 Claims, 1 Drawing Sheet

(51) Int. Cl.
  *B29B 11/16* (2006.01)
  *B29C 49/00* (2006.01)
  *B29B 11/14* (2006.01)
  *B29C 49/06* (2006.01)
  *B29D 22/00* (2006.01)
  *B65D 1/06* (2006.01)
  *B29K 105/00* (2006.01)
  *B29K 227/18* (2006.01)
  *B29B 11/08* (2006.01)
  *B29K 67/00* (2006.01)
  *B29C 49/12* (2006.01)
  *B29C 49/02* (2006.01)
  *B29L 31/00* (2006.01)

(52) U.S. Cl.
  CPC .......... *B29C 49/0078* (2013.01); *B29C 49/06* (2013.01); *B29D 22/003* (2013.01); *B65D 1/02* (2013.01); *B65D 1/0223* (2013.01); *B65D 1/0261* (2013.01); *B65D 1/06* (2013.01); *B65D 35/08* (2013.01); *B29B 11/08* (2013.01); *B29B 2911/14013* (2013.01); *B29B 2911/1444* (2013.01); *B29B 2911/1448* (2013.01); *B29B 2911/14326* (2013.01); *B29B 2911/14333* (2013.01); *B29B 2911/14426* (2013.01); *B29B 2911/14606* (2013.01); *B29B 2911/14913* (2013.01); *B29C 49/12* (2013.01); *B29C 2049/023* (2013.01); *B29C 2049/024* (2013.01); *B29K 2067/00* (2013.01); *B29K 2105/0032* (2013.01); *B29K 2105/0094* (2013.01); *B29K 2227/18* (2013.01); *B29K 2995/004* (2013.01); *B29K 2995/005* (2013.01); *B29L 2031/712* (2013.01); *Y10T 428/1352* (2015.01); *Y10T 428/1383* (2015.01); *Y10T 428/1397* (2015.01)

(58) Field of Classification Search
  CPC .......... B29C 49/0078; Y10T 428/1352; Y10T 428/1379; Y10T 428/1383; Y10T 428/1397
  See application file for complete search history.

(56) References Cited

U.S. PATENT DOCUMENTS

2003/0031814 A1   2/2003   Hutchinson et al.
2009/0223920 A1   9/2009   Patel et al.

FOREIGN PATENT DOCUMENTS

WO    WO 98/07556 A1    2/1998
WO    WO 01/83193 A1    11/2001

OTHER PUBLICATIONS

Written Opinion (PCT/ISA/237) dated Nov. 15, 2013, by the Swiss Patent Office as the International Searching Authority for International Application No. PCT/EP2013/003002.

* cited by examiner

PREFORM AND CONTAINER

RELATED APPLICATION(S)

This application claims priority as a continuation application under 35 U.S.C. § 120 to PCT/EP2013/003002, which was filed as an International Application on Oct. 5, 2013 designating the U.S., and which claims priority to Swiss Application No. 02287/12 filed in Switzerland on Nov. 7, 2012. The entire contents of these applications are hereby incorporated by reference in their entireties.

FIELD

The disclosure relates to an injection-molded preform for manufacturing plastic containers in a stretch blow molding process.

BACKGROUND INFORMATION

A large number of plastic bottles and similar plastic containers used today are manufactured in a stretch blow molding process. In this process, a so-called preform is first manufactured with a generally elongated, tube-like shape. This shape can have a bottom on one of its longitudinal ends. On the other end, it can have a neck section with an interlocking connection of a closure with a corresponding engagement. The interlocking connection of a closure can be, for example, threads formed on the outer surface of the neck piece or bayonet-like protrusions or recesses. The preform is inserted into a mold cavity of a blow mold and inflated using a medium, usually air, that is blown in via overpressure. Additionally, the preform is thereby axially elongated with a horizontal bar that is driven through the neck opening. After the stretching/blowing process, the finished plastic container is demolded out of the blow mold.

In the so-called one-step stretch blow molding process, the preform can be reshaped into a plastic container immediately following its manufacture in the injection-molding process, without intermediate cooling and storage. Plastic containers can be, however, generally manufactured in a two-step stretch blow molding process, in which the preforms are initially injection-molded, cooled, and stored for later use. The manufacture of the plastic containers takes place separately (both spatially and temporally) in a separate stretch blow molding process. In this later stretch blow molding process, the preforms can be heated again in order to make plastic bottles. In order to do this, for example, a desired temperature profile is set using infrared radiation over the axial and/or radial extent of the preform. This temperature profile enables the stretch blow molding process. After the preform is set into the molding tool, it is radially shaped using a gas that is blown in with overpressure and axially stretched using a stretching rod. Afterwards, the finished plastic container is demolded.

In the production of mass-produced items (like, for example, plastic bottles made of polyethylene terephthalate, or PET), material usage represents a factor for competitiveness and environmental balance. Due to the very high quantities in which plastic bottles are manufactured, reductions of the material weight on the order of tenths of a gram can very quickly lead to material saving on the order of tons. As a result, great efforts were taken in the past to reduce the material weight of the preforms for plastic bottles, especially PET bottles. With the preforms known from the prior art, it was believed that the optimum had been reached. The plastic bottles manufactured from the preforms are manufactured to meet the required mechanical strengths, temperature stabilities, and gas barrier characteristics. The efforts to reduce the material weight were disadvantageous in that they required multiple modifications of the stretch blow molding devices and the bottling plants. This is, from the standpoint of the stretch blow molding device operator as well as from the standpoint of the bottler of plastic containers made from the preform, an extremely unsatisfactory state of affairs.

Preforms known from the prior art can have, in the neck section, minimum wall thicknesses of 0.9 mm to 2 mm. These wall thicknesses are used to impart to the neck section, which is not further strain-hardened during the stretch blow molding process, the mechanical strength, the gas-tightness, and the internal stress resistance necessary for the reception of the closure, even at raised outside temperatures. Consequently, the neck section of the preform makes a not-insignificant contribution to the overall weight (and therefore to the material usage of the preforms).

SUMMARY

An injection-molded preform is disclosed for manufacturing plastic containers, in a stretch blow molding process, the injection molded preform comprising: an elongated preform body including one longitudinal end formed closed; and another longitudinal end, lying opposite the one longitudinal end, connected to a neck section provided with a pour opening and on whose outer wall is formed a connector for making an interlocking connection with a closure equipped with corresponding connector, wherein the neck section has at least one constriction that extends all the way around the neck section at least in places and has a wall thickness of 0.4 mm to 0.8 mm, and the injection-molded plastic material exists on the at least one constriction in a state that is highly oriented and at least partially crystalline, due to an injection-molding process.

BRIEF DESCRIPTION OF THE DRAWINGS

Further advantages and characteristics will become clear from the following description of exemplary embodiments of the disclosure with the aid of the schematic drawings, wherein.

DETAILED DESCRIPTION

Figure 1:
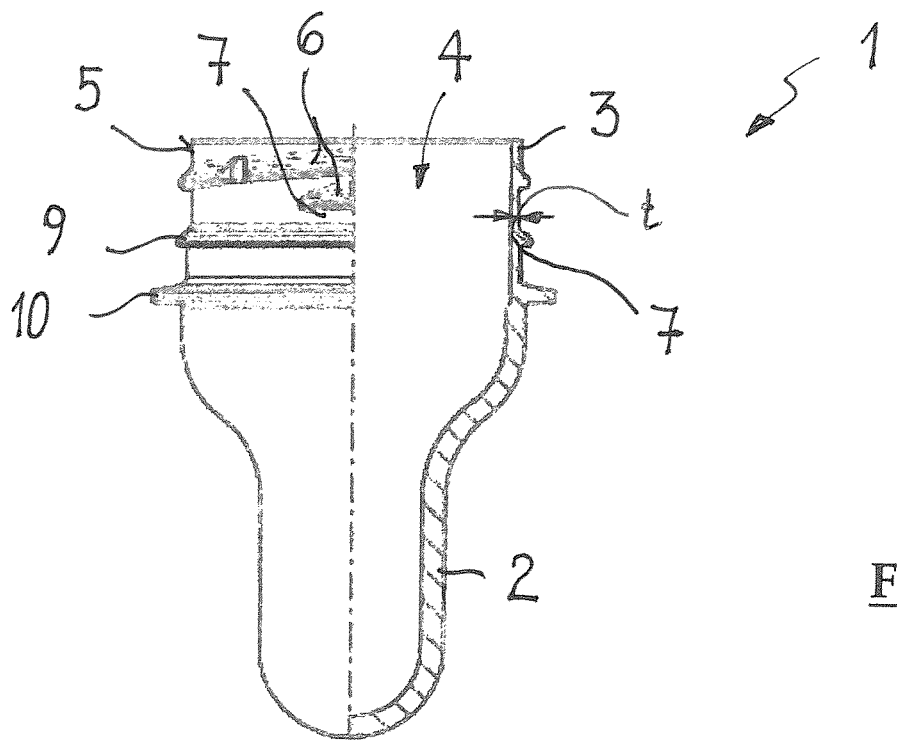
FIG. 1 shows an axial cut-away preform with a neck section formed according to an exemplary embodiment of the disclosure.

Exemplary embodiments of the present disclosure can improve a preform for manufacturing any desired plastic containers, for example plastic bottles, in a stretch blow molding process to the effect that the material usage can be even further reduced. The preform should be mass-producible in an injection-molding process and should be suited for processing on known stretch blow molding devices. Thus, modifications to the stretch blow molding devices and the bottling plants can be avoidable. The required mechanical strengths, gas-tightness, internal stress resistance, and thermal stability of the plastic containers made from the preforms should remain guaranteed.

The accomplishment of these tasks is done by an injection-molded preform for manufacturing plastic containers, especially plastic bottles, in a stretch blow molding process.

In accordance with exemplary embodiments of the disclosure, an injection-molded preform for manufacturing plastic containers, for example plastic bottles, in a stretch blow molding process is created, which preform can have an essentially elongated preform body—one longitudinal end of which is closed. On the opposing longitudinal end, a neck section (equipped with an opening for pouring) connects to the preform body. Fixtures for the interlocking connection of a closure with a corresponding connector are formed on the outer wall of this neck section. The neck section can have at least one constriction, which extends all the way around, at least in places, with a wall thickness of, for example, 0.4 mm to 0.8 mm. The injection-molded plastic material exists at least on the at least one constriction in a state that is highly oriented and at least partially crystalline, due to an injection-molding process.

Surprisingly, the neck section of the preform is not weakened by the constrictions or thin-walled areas. Rather, the molecular chains of the plastic material on the constrictions have a highly oriented alignment. Between the oriented molecular chains, intermolecular forces emerge that lead to an increased stiffness and tensile strength. The molecular chains arrange themselves with respect to each other and approach each other. This leads to a measurable increase in density. With an increase in density above a predetermined value, the visual characteristics of the constrictions can be changed. Light falling into the constrictions can thus be more intensively scattered, so that these constrictions can appear murky or milky.

For the definitions of the present disclosure, the determination of the density takes place according to the measurement method described in the standard ASTM D 1505-10. This measurement method makes it possible to determine density to within 0.001 g or less. The measured density allows conclusions to be drawn about the orientation, the crystallization, and the strength of the constrictions. Nonetheless, amorphous PET can (depending on added copolymers and/or additives) reach different density values. Values between 1.320 g/cm$^3$ and 1.339 g/cm$^3$ are known.

In order to be able to use the measurement method described in the standard ASTM D 1505-10 despite the copolymers and/or additives added to the amorphous PET, it is determined for the purposes of this disclosure that an average density of the preform determined under the reinforcing ring constitutes a first reference value. If the preform can have no reinforcing ring, the density should be determined in an area of the preform body that is immediately below the neck section. Preferably, the density can be ascertained at at least three separate and distinct measuring points along an extent of the preform, and the average density can be determined from these values. Regardless of any possibly actually existing crystallization, it is defined for the purposes of this disclosure that no crystallization exists at the measurement position(s) at which the first reference value was determined—meaning, the degree of crystallization is 0%. Further, for the purposes of this disclosure, a second reference value is determined that is 0.120 g/cm$^3$ larger than the first determined value. This second reference value corresponds, according to the definition, to a degree of crystallization of 100%. The degrees of crystallization between the two reference values are directly proportional to the determined density values.

For example: An average density of 1.330 g/cm$^3$ is determined as the first reference value. According to the definition above, this average density corresponds to a degree of crystallization of 0%. According to the definition, the degree of crystallization of 100% lies at a density of 1.450 g/cm$^3$, which represents the second reference value. Due to the direct proportionality between the density values and the degrees of crystallization, the degree of crystallization is 25% at a density of 1.360 g/cm$^3$, 50% at a density of 1.390 g/cm$^3$, and 75% at a density of 1.420 g/cm$^3$.

The crystallization takes place essentially only on the constrictions in the neck section. As a rule, there is no crystallization on the fixtures arranged on the neck section for the connection of closures to seal the opening, as the wall thicknesses around these fixtures are generally greater than 0.4 mm to 0.8 mm.

Exemplary embodiments of the disclosure take advantage of the fact that a molten plastic that is pressed through very thin-walled areas undergoes strain-hardening in those same areas and exists in a state that is highly oriented and at least partially crystalline, thanks to an injection-molding process. The degree of crystallization (determinable, for example, via density measurements) of the plastic can be very high, at least on the constrictions. A "highly oriented state" is understood, according to exemplary embodiments of the disclosure, to mean an orientation degree, determinable via density measurements, of at least 3%. The highly oriented state of the plastic on the constrictions of the neck section often also leads to a very strong visual anisotropy of the plastic. This anisotropy can, in transparent plastics, often lead to an opacification or white coloration of the constrictions. These opacifications and colorations are consciously accepted. As a rule, they are immaterial on the neck section of the preform or the plastic containers manufactured therefrom, as they are typically covered by the closure anyhow. Through the targeted provision of one or more constrictions that extend all the way around at least in places, plastic can be saved in the neck section of the preform. As the preform experiences no change structurally, it can be processed on known stretch blow molding devices/a plastic container manufactured therefrom is transportable and Tillable without modification to known bottling devices.

The degree of crystallization can, naturally, also be higher than 3%. According to an exemplary embodiment of the disclosure, the degree of crystallization amounts to between roughly 5% and 7%. According to an exemplary embodiment of the disclosure, the degree of crystallization amounts to between roughly 7% and 9%. The higher the degree of crystallization, the higher the strength at the same thickness or wall thickness of the constriction. Consequently, it is possible to achieve thinner wall thicknesses at the constriction by a higher degree of crystallization at the same strength. For example, the strength and an associated resilience can, using the same material, be identical between a first constriction with a first wall thickness of 0.6 mm and a first degree of crystallization of 5% and a second constriction with a second wall thickness of 0.4 mm and a second degree of crystallization of 8%.

The manufacture of the preform according to an exemplary embodiment of the disclosure takes place using an injection-molding system. The preform is injection-molded out of a molten mass of plastic at spray pressures of, for example, 1500 bar to 4000 bar, measured at the melt reservoir or, in injection-molding systems without melt reservoirs, directly at the nozzle. The plastic material is thereby not present as a thin molten mass; rather, it can have a viscosity that corresponds to that of plastic materials for known preforms.

Through this manufacturing process, the suggested preform differentiates itself from a known preform for the Hot Fill method, whose entire neck is subjected to heat treatment in one of the systems following the injection-molding system. In this known method, the entire neck of the preform is crystallized, thus increasing the density as well as the thermal and mechanical characteristics. In this known method, however, there is no savings of plastic material.

The preform according to an exemplary embodiment of the disclosure includes a plastic material that can have at least one polymer from the group comprising polyester, polyethylene terephthalate, and polyethylene terephthalate copolymers.

Depending on requirements, the plastic material can also have dyes and/or fillers and/or lubricant and/or petroleum- or biologically based additives.

For most applications, the preform can include a plastic material that is essentially polyethylene terephthalate (PET). At the at least one constriction, the PET can have a degree of crystallization that is equal to or greater than 3%, whereby the degree of crystallization is determined at an intrinsic viscosity from 0.78 dl/g to 0.84 dl/g, which is measured according to ISO 1628-5. The solvent for dissolving the PET to determine the intrinsic viscosity can be, for example, a mixture of phenol and 1,2-dichlorobenzene at a mixing ratio of 1:1. The measuring temperature amounts to roughly 25° C. The viscosity measurement and its conversion take place, for example, according to the method that is described in the article "Clarification of Viscosity Measurements of PET" from PlasticsEurope and is available on the webpage for PlasticsEurope at http://www.plasticseurope.org/Documents/Document/20100301163022-ClarificationViscosityMeasurementsPET-20070402-002-EN-v1.pdf.

A plastic container that is manufactured in a stretch blow molding process from an injection-molded preform configured according to an exemplary embodiment of the disclosure can have a body section and an associated container neck whose geometry essentially corresponds to that of the preform. The container neck also can have mechanical, thermal, and barrier characteristics that essentially correspond to those of the neck section of the preform. This is due to the fact that the neck section of the preform remains essentially unchanged in the stretch blow molding process. Generally, the neck section of the preform protrudes out of the cavity of the blow mold tool and therefore remains unaffected by the stretch blow molding process. The geometries and characteristics formed on the neck section of the preform exist therefore practically identically on the container neck.

The mechanical and thermal characteristics of the container neck of the plastic container are adjusted such that an exemplary container neck exhibits, during a 24-hour internal pressure loading of 4 bar at a temperature of 38° C.+/−1° C., an inner diameter expansion that is less than or equal to 1% of the inner diameter without internal pressure loading.

In an exemplary embodiment of the disclosure, the mechanical and thermal characteristics of the container neck are such that the container neck, during a 24-hour internal pressure loading corresponding to a carbonization of the fill content from 4 g/l to 9 g/l at a temperature of 38° C.+/−1° C., exhibits an inner diameter expansion that is less than or equal to 1% of the inner diameter without internal pressure loading. These characteristics can ensure that the plastic container will withstand increased temperatures (especially those that come about in the summer months) without notable deformation of the container neck.

In an exemplary embodiment of the plastic container, the characteristics of the container neck are adjusted such that the container neck exhibits, at a temperature of between 50° C. and 55° C. and a 3-second-long load with 200N, an axial length contraction of less than 0.5%. By this adjustment of the characteristics of the plastic neck, deformation of the plastic neck during the blow molding process through the blow nozzle can be avoided to the greatest extent possible.

FIG. 1 shows an axial cut-away preform according to an exemplary embodiment of the disclosure that, as a whole, carries the reference sign 1. The preform 1 can have an elongated preform body 2, one longitudinal end of which is formed closed. On the opposing end, the preform body 2 attaches to a neck section 3 that is provided with a pour opening 4. The neck section 3 is provided with a connector 6 on its outer wall 5. These serve to make an interlocking connection with a closure that can have correspondingly shaped connector and that is not shown in greater detail. According to the embodiment example depicted, the connector 6 are formed as threads that interlock with the inner threading of a screw closure.

The preform 1 can be formed with one or more layers. All plastic materials suitable for the injection-molding and stretch blow molding process are eligible—for example polyester, polyethylene terephthalate, and polyethylene terephthalate copolymers. Depending on the requirements of the plastic container to be manufactured from the preform, the plastic material can also incorporate dyes and/or fillers and/or lubricant and/or petroleum- or biologically based additives.

The preform 1 can, as depicted, be equipped with a support ring 10, which somewhat radially protrudes on the transition from the preform body 2 to the neck section 3. Between the connector 6 formed as threads and the support ring 10, a so-called snap ring 9 can also be formed, which serves, for example, as an abutment for a guarantee closure on the finished stretch blow molded plastic container. Such guarantee closures are adequately known, for example, from beverage bottles. When the guarantee closure is unscrewed, a ring-like section of the guarantee closure (for which the snap ring forms an abutment) is at least partially separated from the rest of the closure. As a result, the user is shown, even by a bottle that has been closed again, that the bottle has already been opened once. The snap ring 9 can, in the case of oil bottles or the like, also serve to fix the lower part of the commonly used hinge closure. In an exemplary embodiment (not further depicted), the preform can also be formed without a support ring.

The neck section can have at least one constriction 7, which extends at least in places over the circumference. According to the exemplary embodiment depicted, the constriction 7 is provided between the snap ring 9 and the end of the threads 6. At the constriction 7, the neck section 3 can have a wall thickness t between 0.4 mm and 0.8 mm. The plastic material is highly oriented at least on the constriction and is, thanks to the injection-molding process, at least partially crystalline, whereby the mechanical and thermal strength of the neck section 3 is increased. According to exemplary embodiments of the present disclosure, the term "highly oriented" means that the injection-molded plastic material can have a degree of crystallization of at least 3% that is determinable by a density measurement. The neck section 3 of the preform 1 can also have other constrictions that again extend all the way around at least in places. For example, the other constrictions can be provided between the threads or in the area between the snap ring and the support ring. The constrictions can have different wall thicknesses, each according to which degree of crystallization and corresponding thermal and mechanical strengths are sought after in the respective area of the preform neck. In each case, the constrictions have, however, wall thicknesses between 0.4 mm and 0.8 mm.

Figure 2:
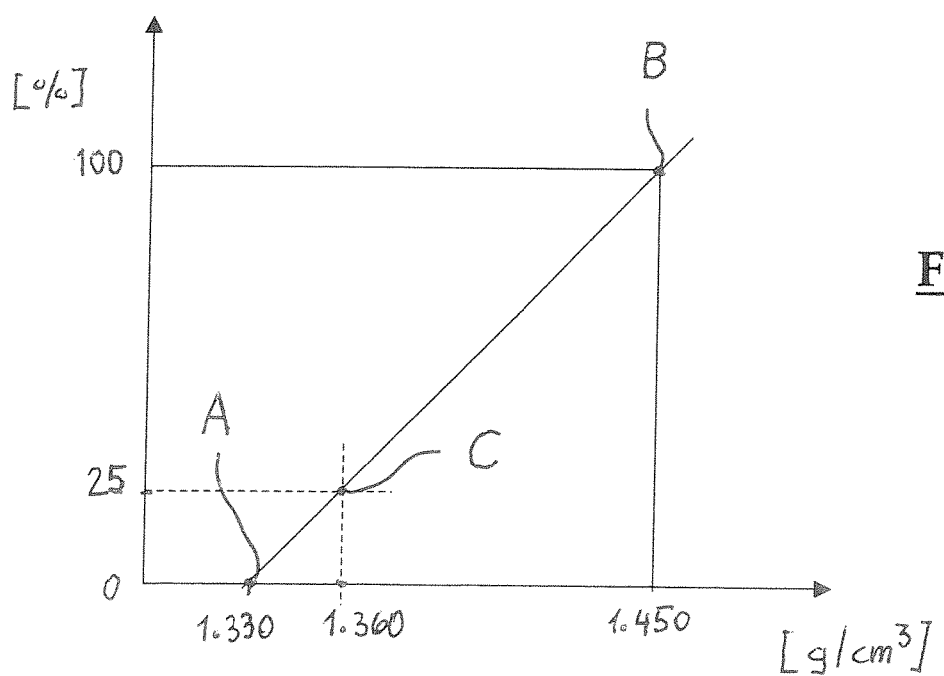
FIG. 2 shows an exemplary diagram explaining a correlation between density and degree of crystallization according to an exemplary embodiment of the disclosure.

In FIG. 2, a Cartesian coordinate system is depicted, on whose x-axis the density [in g/cm³] is plotted and on whose y-axis the degree of crystallization [in %] is plotted. The density of the essentially polyethylene terephthalate preform is determined according to the measurement method described in the standard ASTM D 1505-10. The plotted average value of the density of 1.330 g/cm³ is ascertained from three measuring points found immediately below the support ring 10. This value constitutes a first reference value A. According to the definition, the degree of crystallization at this density value is equal to 0%; this is independent of any crystallization that can actually exist. A second reference value B is derived by adding the value 0.120 g/cm³ to the first reference value for density. At this second reference value B, at which the density amounts to 1.450 g/cm³, the degree of crystallization is 100%, according to definition. All degrees of crystallization between these two reference values A and B are directly proportional to the determined density values. The density is determined at an intrinsic viscosity of 0.78 dl/g to 0.84 dl/g, measured according to ISO 1628-5. With regard to the exemplary embodiment portrayed in the diagram, the measured density at the constriction amounts to, for example, 1.360 g/cm³. Hence, the degree of crystallization is 25%, which is indicated in the diagram in FIG. 2 by the point C.

The provision of targeted constrictions in the neck section of the preform leads to a savings of plastic material. The plastic materials used do not exist as a thin molten mass for the injection-molding process. Rather, they have viscosities that are comparable to the viscosities of the plastic materials used to manufacture injection-molded preforms known from the prior art. The manufacture of the preform takes place in injection-molding systems using a molten mass of plastic material at spray pressures of 1500 bar to 4000 bar, measured at the melt reservoir or, in injection-molding machines without melt reservoirs, directly at the nozzle. The reduction of weight in the neck section of the preform—without sacrificing strength—also can have the advantage that a center of gravity of the preform settles further away from the neck piece in the direction of the preform body. As a result, a better alignment of the preform can be achieved. If the preforms are, for example, packed into shipping containers after assembly, the settling of the center of gravity in the direction of the preform body makes sure that they make it into the container preform-body first. Finally, the targeted settlement of the center of gravity of the preform in the direction of the preform body (due to the weight reduction in the neck section) can also prove to be advantageous when feeding and transporting the preforms in the stretch blow molding system, as they are much more likely to make it to the blow mold accurately positioned—that is, with the preform body aligned downward. As a result, the amount of effort for correctly aligning the preforms can be reduced. After the neck section of the preform ceases to change in the subsequent stretch blow molding process—often, the neck section protrudes out of the mold cavity of the blow mold tool during stretch blow molding—a plastic container, manufactured from the preform according to an exemplary embodiment of the disclosure, can have in its container neck the mechanical and thermal characteristics or barrier characteristics that were already established during the injection-molding of the preform.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An injection-molded preform for manufacturing plastic containers, in a stretch blow molding process, the injection molded preform comprising:
   an elongated preform body including one longitudinal end formed closed; and
   another longitudinal end, lying opposite the one longitudinal end, connected to a neck section provided with a pour opening and on whose outer wall is formed a connector for making an interlocking connection with a closure equipped with corresponding connector, wherein the neck section has at least one constriction having a wall thickness of 0.4 mm to 0.8 mm, and the injection-molded plastic material of the at least one constriction is highly oriented and at least partially crystalline, due to an injection-molding process, the plastic material forming the at least one constriction having an average density greater than an average density of the material forming portions of the neck section which do not include the at least one constriction.

2. The injection-molded preform according to claim 1, wherein the injection-molded plastic on the at least one constriction comprises:
   a degree of crystallization equal to or greater than 3% and determinable via a density of the injection-molded plastic material.

3. The injection-molded preform according to claim 1, wherein the preform is injection-molded from a molten mass of plastic material at spray pressures from 1500 bar to 4000 bar, measured at the melt reservoir or, in injection-molding machines without melt reservoirs, directly at the nozzle.

4. The injection-molded preform according to claim 1, the plastic material comprising:
   a polyester, a polyethylene terephthalate, a polyethylene terephthalate copolymers, or a combination thereof.

5. The injection-molded preform according to claim 1, the plastic material, comprising:
   at least one of dyes, fillers, lubricant, and petroleum- or biologically based additives.

6. The injection-molded preform according to claim 1, the plastic material consisting essentially of polyethylene terephthalate and having, on the at least one constriction, a degree of crystallization that is equal to or greater than 3%, whereby the degree of crystallization is determined via density measurements according to standard ASTM D 1505-10 at an intrinsic viscosity of 0.78 dl/g to 0.84 dl/g, which is measured according to ISO 1628-5.

7. The injection-molded preform according to claim 6, wherein the degree of crystallization of the at least one constriction amounts to between 5% and 7%.

8. The injection-molded preform according to claim 6, wherein the degree of crystallization of the at least one constriction amounts to between 7% and 9%.

9. The injection-molded preform according to claim 1, the neck section comprising:
   a plurality of constrictions extending all the way around at least in places, each of which has a wall thickness of between 0.4 mm and 0.8 mm.

10. The injection-molded preform according to claim 9, wherein at least one constriction of the plurality of constrictions, has a different wall thickness than at least one other constriction of the plurality of constrictions.

11. A plastic container manufactured in a stretch blow molding process from an injection-molded preform according to claim 1, with a body section and associated container neck, whose geometry essentially corresponds to that of the preform, whereby the container neck has mechanical, thermal, and barrier characteristics that essentially correspond to those of the neck section of the injection-molded preform.

12. The plastic container according to claim 11, wherein the container neck is configured to exhibit, during a 24-hour internal pressure loading of 4 bar and at a temperature of 38° C.+/−1° C., an inner diameter expansion that is less than or equal to 1% of the inner diameter without internal pressure loading.

13. The plastic container according to claim 11, wherein the container neck is configured to exhibit, during a 24-hour internal pressure loading corresponding to a carbonization of the fill content from 4 g/l to 9 g/l and at a temperature of 38° C.+/−1° C., an inner diameter expansion that is less than or equal to 1% of the inner diameter without internal pressure loading.

14. The plastic container according to claim 11, wherein the container neck is configured to exhibit, at a temperature between 50° C. and 55° C. and a 3-second-long axial load with 200N, an axial length contraction of less than 0.5%.

* * * * *